Figure 1:
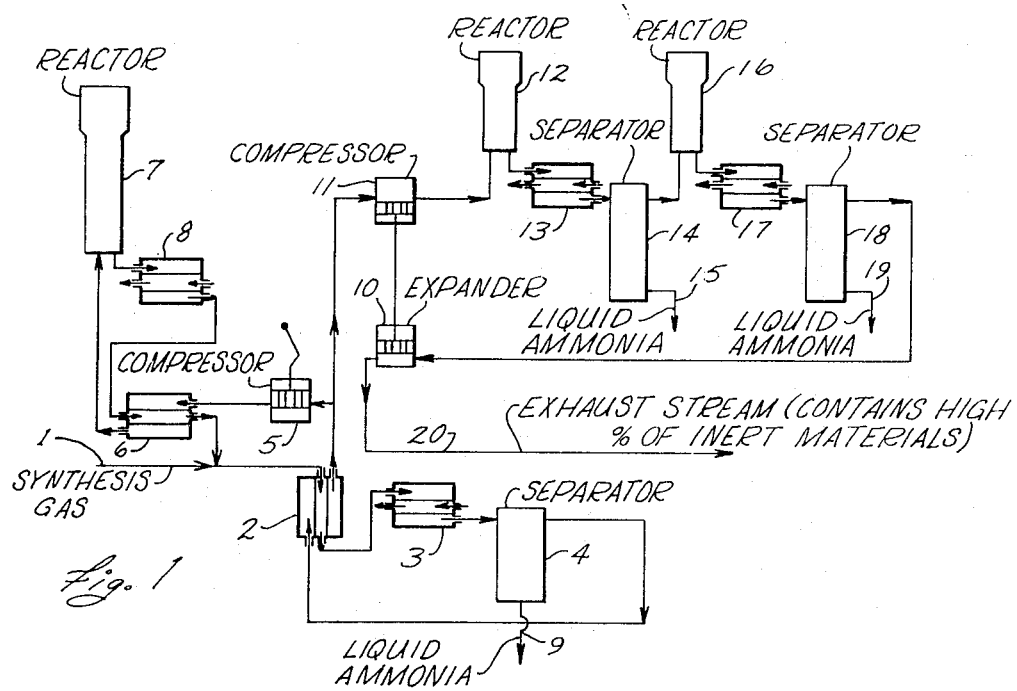

United States Patent

[11] 3,615,200

[72] Inventor Keizo Konoki
Chiba, Japan
[21] Appl. No. 736,844
[22] Filed June 13, 1968
[45] Patented Oct. 26, 1971
[73] Assignee Toyo Engineering Corporation
Tokyo, Japan
[32] Priority June 14, 1967
[33] Japan
[31] 42/37597

[54] PROCESS FOR CONCENTRATING INERT COMPONENTS IN PRESSURIZED SYNTHESIS LOOP
10 Claims, 2 Drawing Figs.

[52] U.S. Cl.................................................. 23/199,
23/289, 260/449.5, 23/1
[51] Int. Cl...................................................... C01c 1/04,
B01j 9/00, C07c 29/16
[50] Field of Search........................................ 23/199;
260/449.5

[56] References Cited
UNITED STATES PATENTS
1,639,272  8/1927  Reed.............................  23/199
3,054,660  9/1962  Brooks et al..................  23/199

Primary Examiner—Oscar R. Vertiz
Assistant Examiner—Hoke S. Miller
Attorney—Woodhams, Blanchard and Flynn ABSTRACT: In a circulating pressurized synthesis system, such as an ammonia synthesis system and a methanol synthesis system, a portion of the circulating stream of the circulatory synthesis system is separated from the circulating stream, fresh reactants are, if desired, added to the portion, and then the portion is compressed at least once to a pressure higher than that of the circulatory pressurized synthesis system. The compressed portion is passed through a synthesis reactor containing catalyst at high temperature so that a further reaction is promoted. The product obtained by the further synthesis reaction is separated from the effluent of the synthesis reactor, and, if desired, the energy which is generated by expanding the balance of the effluent to a pressure lower than that of the circulatory pressurized synthesis system is utilized to supply the power necessary to initially compress the portion.

PATENTED OCT 26 1971

3,615,200

INVENTOR.
KEIZO KONOKI
BY
Woodhams, Blanchard & Flynn
ATTORNEYS

PROCESS FOR CONCENTRATING INERT COMPONENTS IN PRESSURIZED SYNTHESIS LOOP

This invention relates to an improved process for effectively removing the inert components present in a circulatory pressurized synthesis system.

In pressurized synthesis processes in which inert components not related to the synthesis reaction of the desired products are present, such as processes of synthesizing ammonia or methanol, and in case the processes are carried out by a method which involves recirculating unreacted materials, which method is commonly employed when the conversion rate of the materials per one pass through the reaction zone is considerably smaller than 100 percent, the removal of the inert components necessitated in this case inevitably involves the exhaustion of reactants and it therefore results in a remarkable deterioration of the overall efficiency of production.

The purpose of this invention is to remove the inert components effectively whole minimizing the removal of the reactants, thereby improving the overall efficiency of the process.

In a circulatory pressurized synthesis system, namely a pressurized synthesis system in which unreacted materials are recirculated, the inert components are kept at a constant concentration by the continuous removal of a portion of the circulating stream. In this case the concentration of the inert components in the circulating stream is found to be nearly equal to that of the discharged stream.

Therefore, for the purpose of increasing the concentration of the inert components in the discharge stream, the approach of increasing the pressure of the entire circulatory synthesis system thereby accelerating the conversion to the desired products and the separation by condensation thereof, will give rise to increased cost of equipment and operation for the whole circulatory pressurized synthesis system and therefore it will lower the economic efficiency of the process.

These drawbacks can be completely eliminated by the process of this invention. This process can be equally applied to the synthesis of ammonia and of methanol, the former being usually carried out at a pressure of ca. 150–1,000 atm. and involving methane and argon as the principal inert components, whereas the latter is operated usually at ca. 300 atm. and involves methane and nitrogen as the principal inert components.

The following explanation, which shall be chiefly concerned with examples of syntheses of ammonia and methanol, shall not restrict the general applicability of this process. Stated differently, this invention can be applied not only to the syntheses of ammonia and methanol but also to any process employing a circulatory pressurized synthesis system in which the raw material gas contains inert components.

It is well known that ammonia can be synthesized from nitrogen and hydrogen in the presence of a suitable catalyst and under appropriate pressure and temperature conditions, i.e. a pressure of ca. 150–1,000 atm. and a temperature of ca. 350–550 C.

The synthesis gas, composed of a mixture of hydrogen and nitrogen, is usually prepared by catalytic or noncatalytic cracking of solid carbon-containing substances or fluid hydrocarbons in the presence of steam, air, or oxygen, or a mixture thereof in an arbitrary ratio under elevated temperature and atmosphere or elevated pressure.

The gas thus obtained from the cracking apparatus is composed of hydrogen, carbon monoxide and carbon dioxide, and usually contains small amounts of nitrogen and argon as well as methane formed as a result of the incompleteness of the cracking.

Therefore, the preliminary of said crude synthesis gas for obtaining hydrogen or hydrogen and nitrogen necessary for the synthesis of ammonia in as pure a state as possible are usually comprised primarily of the conversion of the carbon monoxide into carbon dioxide and secondly the removal of carbon dioxide.

After these preliminary treatments, the synthesis gas contains methane, argon, and small amounts of the remaining carbon monoxide and carbon dioxide in addition to hydrogen an nitrogen. Said small amount of remaining carbon monoxide can be eliminated by scrubbing with liquid nitrogen, scrubbing with cuprous salt solution, or methanation. The synthesis gas purified by methods other than scrubbing with liquid nitrogen causes methane and argon to accompany the hydrogen and nitrogen which are necessary for the synthesis of ammonia.

This gas, when compressed and introduced into the loop of an ammonia synthesis system, usually shows a relatively low conversion rate to ammonia. The concentration of ammonia at the outlet of the synthesis reactor is usually 10 to 30 percent by volume, roughly corresponding to the pressure of synthesis of 150 and 1,000 atm. respectively.

The synthesis of ammonia can therefore be economically carried out only when the gaseous mixture composed of ammonia, unreacted hydrogen and nitrogen, methane and argon is recirculated to the reactor after the ammonia contained therein is separated by condensation or absorption.

It is well known that argon and methane, which are not involved in the reaction, gradually accumulate in the ammonia synthesis loop, while unreacted hydrogen and nitrogen are converted into ammonia by recirculation. Therefore, these inert components should be removed from the loop.

A well-known solution for this technical problem consists of the continuous removal of a portion of the circulating stream from the ammonia synthesis loop, and this method is capable of maintaining the concentration of the inert components, i.e., methane and argon, in the loop at a constant level.

However, the prior method of simply removing a portion of the circulating stream from the ammonia synthesis loop inevitably results in the waste of available hydrogen and nitrogen together with the inert components.

The advent of modified copper-type shift catalyst for converting carbon monoxide into carbon dioxide, and the methanation process simplified the removal of carbon monoxide and therefore have resulted in the economic rationalization of the entire ammonia synthesis. On the other hand the use of a methanation reaction increases the inert methane and consequently increases the reactants wasted from the synthesis loop when the inert components are removed.

Nevertheless it should be understood that the methanation process is still favorable in spite of the increase of the inert component stream removed and the accompanying increase in the loss of hydrogen and nitrogen. Besides, the decrease of the remaining carbon monoxide as a result of the use of modified copper-type shift catalyst minimizes the drawback of increased loss of reactants.

The intention of the inventor is to improve further the synthesis process by preventing or decreasing the loss of reactants caused by the removal of the inert components.

The present invention consists of removing a portion (discharge stream) of the circulating stream from the circulatory pressurized synthesis system; adding, if necessary, the reactants to the discharge stream; compressing the discharge stream at least once to thereby carry out a further reaction; separation the desired products from the discharge stream after the further synthesis reaction, and, if desired, utilizing the energy, which is generated by expanding the balance of the discharge stream to a pressure lower than that in the circulatory pressurized synthesis loop, to supply the power or a part thereof necessary for initially compressing the discharge stream. Thereby, the loss of unreacted reactants caused by the removal of inert components from the circulatory pressurized synthesis system is discreased.

It was measured, for example, that an ammonia synthesis apparatus produced ammonia at a rate of 20 kg. kg.-mol/hr./m.$^3$ catalyst at 162 atm. and 400° C. from a mixture containing 10 percent vol. of inert components consisting of argon and methane and 9 percent of vol. ammonia, the balance being a 3:1 mixture of hydrogen and nitrogen, while the same apparatus with same catalyst produced ammonia at the rate of 30kg.-mol/hr./m.$^3$catalyst at 475atm. and 400° C. from a mixture containing 40percent of similar inert components and 9percent vol. of ammonia, the balance being a similar mixture of hydrogen and nitrogen. In other words, a reaction which previously terminated under a certain pressure is again activated and acquires a considerable reaction velocity under a higher pressure.

The inventor, has discovered the present invention and thus has succeeded in preventing the loss of reactants induced by the removal of inert components and in improving the overall efficiency of the synthesis process.

The first advantage of this invention lies in the remarkable decrease of the loss of the reactants which was induced by the removal of the inert components and which has previously been considered to be inevitable.

Analyses of various synthesis apparatus revealed that the lowering of the performance of such apparatus by the accumulation of inert components is always caused by a decrease in the partial pressure of the reactants as the result of an increase in the partial pressure of the inert components. The second advantage of this invention therefore lies in the remarkable improvement in the efficiency of the pressurized synthesis loop in addition to the prevention of loss of reactants. Namely, the amount of inert components removed, which has necessarily been selected to be as low as possible in the prior art, can be increased in this process so as to decrease the concentration of the inert components in the pressurized synthesis loop thereby enabling the reaction of forming the desired products in the loop to be promoted.

Furthermore the third advantage of this invention lies in the fact that the power necessary for compressing the discharge stream can be wholly or partly obtained, if desired, from the energy generated by the expansion to atmospheric pressure of exhaust gas chiefly composed of inert components. This exhaust gas is obtained from after said stream is compressed to convert the reactants contained therein into the desired products and also after the products are separated. Thus, it is possible to dispense with or to minimize another power source.

It is most preferable, therefore, that the expanding device and the compressor are mechanically and directly connected to each other for compressing the discharge stream.

In this case, the compressor or expander cannot perform efficient compression or expansion, unless the the volume of gas having temperature and pressure corresponding to those of the outlet or inlet side, respectively, reaches a limit valve. Although the expander and the compressor can be of the centrifugal type if the flow rate of the circulating stream to be removed is considerably large, said limit value can be reached in the apparatus of usual capacity. Therefore, a plunger-type expander and compressor are preferable for such apparatus.

The most important factor in the connection of the expander and the compressor is the balance of power. Namely, the amount finally removed after reaction under higher pressure depends upon the reaction rate in the reaction of the discharge stream, and the energy generated by the expansion should be exactly equal to the power necessary for compressing the stream to be removed.

According to this invention, said balance is automatically controlled. Namely, if the energy generated by the expansion of the exhaust gas increases the pressure in the supplemental reaction of the discharge stream is immediately increased so as to accelerate the supplemental synthesis reaction in the discharge stream and to decrease the volume of the exhaust gas thereby decreasing the energy given by the expansion. Thus the power of the expander and compressor is automatically balanced.

This well-established self-balancing mechanism is the fourth advantage of this invention.

Furthermore the expansion of the exhaust gas involves the following advantage.

Hydrogen, for example when subjected to isoentropic expansion at 30° C. from 50atm. to 20atm., shows a temperature decrease of ca. 80° C. and therefore reaches ca. −50° C.

Similar effects can be observed in the case of methane and argon. Consequently, if the gas at the inlet of each expander is kept at normal temperature, the exhaust gas stream at the outlet, being at a fairly low temperature, can be utilized as a refrigerating source.

On the other hand, if the gas introduced to the inlet of each expander is kept at a higher temperature by means of some heat source of the synthesis apparatus, the exhaust gas stream at the outlet, being at a relatively high temperature, makes it possible to recover a larger amount of power, although the utilization of the gas as a refrigerating source is no longer possible in this case.

It is also another advantage of this invention that the process can be arbitrarily embodied in one of these two ways according to the economical effect of the whole of the process.

Furthermore an additional advantage of this invention lies in the fact that separation of ammonia contained in the discharge stream can be performed by simple water cooling because the circulating stream to be concentrated is compressed a high pressure. Thus, the separation is much easier when compared with the prior separation methods, such as the condensation method by deep cooling or the scrubbing method with water followed by distillation of the resultant aqueous ammonia solution thereby to separate ammonia.

Since the concentration of the ammonia remaining in the discharge stream under high pressure can be made very small even by simple water cooling, the remaining ammonia can be exhausted with the exhaust gas and and the loss thereof is negligible.

According to this invention, therefore, it is not necessary to recover ammonia from the exhaust gas which is chiefly composed of inert components.

The invention will be further explained in detail by reference to the attached drawings.

IN THE DRAWINGS

Figure 2:
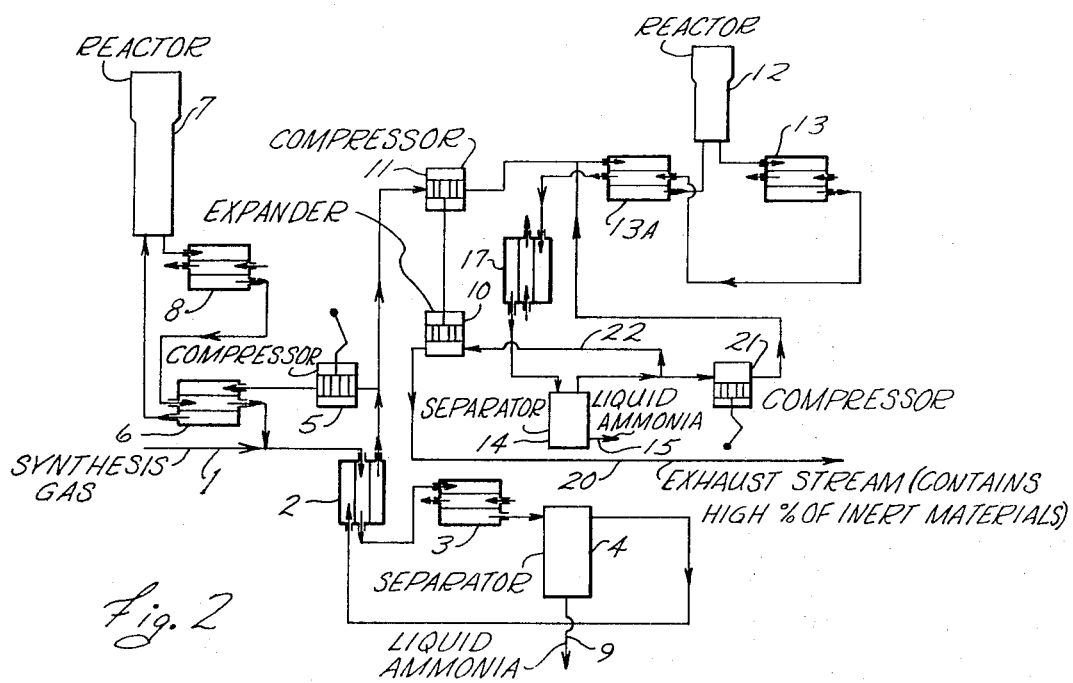

FIG. 1 and FIG. 2 are flow sheets of two different embodiments of this invention. In FIG. 1, the synthesis gas, containing methane and argon as inert components in addition to hydrogen and nitrogen is introduced, through pipe 1 into the loop for ammonia synthesis. The ammonia synthesis loop is composed of heat exchangers 2 and 3, separator 4, circulating compressor 5, heat exchanger 6, reactor 7 and heat exchanger 8.

The incoming synthesis gas joins the stream circulating in the loop, then the combined circulating stream is cooled in the low-temperature heat exchanger 2 and further deeply cooled in the heat exchanger 3. Ammonia contained in the circulating stream is condensed and separated, as liquid ammonia, through the pipe 9 of separator 4.

The circulating stream from which ammonia has been removed is heated in the heat exchanger 2, compressed by the circulating compressor 5, then heated in the heat exchanger 6 by the stream from the reactor 7, and then is introduced into the reactor in which hydrogen and nitrogen are converted into ammonia by the presence of the catalyst contained in the reactor.

The circulating stream containing ammonia leaving the reactor, being at a high temperature, is cooled by heat exchanger 8, then further cooled by the heat exchanger 6 then joins the incoming synthesis gas.

The removal of the inert components may be carried out at an arbitrary point in this loop. However, in this case, the removal is done at a point between the heat exchanger 2 and the circulating compressor 5.

The stream containing the inert components, hereinafter referred to as the discharge stream, is compressed by a compressor 11 which is driven by an expander 10, and said discharge stream is then introduced into a reactor 12 in which the ammonia synthesis reaction again takes place.

The effluent from the reactor 12 is cooled by a heat exchanger 13. Ammonia present in the effluent is condensed in the heat exchanger and separated, as liquid ammonia, from the pipe 15 of separator 14.

These procedures can be repeated, if necessary. Namely, the effluent from the reactor 12 is passed through a reactor 16, heat exchanger 17 and separator 18, and liquified ammonia is separated through the pipe 19.

The high-pressure discharged gas stream from the separator 18, containing a high concentration of in inert components is introduced into the expander 10, in which the gas stream is expanded to generate the power for driving the compressor 11. The discharge gas is exhausted from the pipe 20 at a pressure close to atmospheric pressure for use as a fuel or it is introduced at an appropriately higher pressure to a deep-cooling separator of a well-known type (not shown) in which inert components such as methane and argon are separated. Hydrogen recovered in the deep-cooling separator is mixed with the synthesis gas in the pipe 1.

FIG. 2 shows the process of this invention operated as a circulatory system.

The discharge stream is extracted from the synthesis loop at a point in front of the circulating compressor 5, the same as in FIG. 1. Then it is compressed by the compressor 11 and is introduced into a loop consisting of heat exchangers 13, 13A and 17, reactor 12, circulating compressor 21 and separator 14. The discharge stream to be concentrated and the unreacted components compressed by compressor 21 so as to compensate the loss of pressure in the loop, are united, preheated by the heat exchanger 13A, and introduced into the reactor 12.

The effluent from the reactor 12 is cooled by the heat exchangers 13, 13A and 17, and ammonia formed in the reactor and liquified by the heat exchangers is separated in the separator 14 and is exhausted through the pipe 15. The gaseous mixture from which liquified ammonia has already been separated is compressed by the circulating compressor 21 and is united with the discharge stream to be concentrated.

A portion of the gaseous mixture from which liquified ammonia has already been separated in separator 14 is extracted from this loop at a point between the separator 14 and the circulating compressor 21, and said portion is exhausted through the pipe 22, expander 10 and pipe 20 for use as a fuel or for treatment in the deep-cooling separator as explained in the example referring to FIG. 1.

The concentration of the inert components in the gaseous mixture exhausted from the pipe 20 is much higher than that in the main synthesis loop. The actual advantages of this invention will be explained by reference to a specific example of ammonia synthesis apparatus capable of producing 660 ton/day of ammonia at 150 atm.

The gaseous mixture fed to the ammonia synthesis loop was composed of 60,936 Nm.³/hr. of hydrogen, 20,312Nm.³/hr. of nitrogen and inert components consisting of 658 Nm.³/hr. of methane and 254 Nm.³/hr. of argon.

Dissolution into the final product, i.e. liquid ammonia, is a possible escape route of the inert components. Measurement, however, reveled that the amounts escaping from the apparatus by this route only amounted to 96 and 19 Nm. ³/hr., respectively, in the case of methane and argon.

It was necessary, therefore, to provide another way of removing large amounts of inert components in order to maintain the concentration of the components in the apparatus at the appropriate level. However, the loss of hydrogen, nitrogen and ammonia inevitably resulting from the removal by a simple discharge of the discharge gas amounted to 6,143,2,040 and 164 Nm.³/hr., respectively.

The discharge stream instead of simply being expanded for use as fuel etc., was compressed to 450 atm., heated by heat exhanger and introduced to an reactor of smaller capacity filled with iron catalyst so as to produce an additional quantity of ammonia according to this invention.

Ammonia thus produced was condensed by cooling and then was separated. The gaseous discharge mixture still containing unreacted reactants after passing through the reactor of smaller capacity was introduced into a similar second reactor of small capacity.

Thus the total concentration of methane and argon in the gaseous discharge mixture after passing through the second reactor and removal of liquified ammonia amounted to 26.6 percent whereas the corresponding concentration at the point at which the discharge gas was removed from the main ammonia synthesis loop was only 9 percent. In this example the amount of hydrogen recovered as ammonia was 4,500 Nm.³/hr., corresponding to 7.4 percent of hydrogen fed to the ammonia synthesis apparatus.

Therefore, compared with the case which did not employ the process of this invention, the power economized amounted to 600 kw.-hr. at the high pressure compressor for the synthesis gas, and 400 kw.-hr. at the air compressor for supplying compressed air to the second steam-reforming furnace for providing nitrogen contained in the synthesis gas.

Furthermore the power necessary raising the pressure of the discharge stream to be concentrated from 150 atm. to 450 atm. was almost compensated by the energy obtained by the expansion of gas of 2,997 Nm.³/hr. passed through the second small reactor and second separator from 450 atm. to atmospheric pressure.

Thus the total power economized by this ammonia synthesis process was 1,000 kw.-hr.

In addition to this, the capacities of preparation of synthesis gas, conversion of carbon monoxide, removal of carbon dioxide, removal of carbon monoxide and the high-pressure compressor can be made 7.4 percent smaller. Therefore the total construction cost can be made about 4 percent smaller, with the construction costs for the equipment for compressing the stream to be concentrated, reactors, heat exchangers and power recovering equipment included.

The process of this invention has so far been exclusively explained with regard to the synthesis of ammonia. However, some modifications might become necessary in the case of applying this process to another synthesis process.

In the case of the use of the process in methanol synthesis, an example of composition (vol. percent) of methanol synthesis gas is as follows:

| CO | CO$_2$ | H$_2$ | CH$_4$ | N$_2$ |
|---|---|---|---|---|
| 18.17 | 9.41 | 69.67 | 1.42 | 1.33 |

The amount of hydrogen contained is larger than the stoichiometric amount defined by the following formula:

$$CO + 2H_2 \longrightarrow CH_3OH$$
$$CO_2 + 3H_2 \longrightarrow CH_3OH + H_2O$$

Usually the amount of hydrogen is represented by the index R calculated by the following formula: $R=(H_2-CO_2)/(CO+CO_2)$ Although the stoichiometric relationship is complete when this index is equal to 2, R is usually chosen to be 2.1 or 2.2 in the industrial processes, because the yield of methanol rapidly decreases at R values smaller than 2.

In case of methanol synthesis with a synthesis gas of the above-described composition (vol. percent), the composition of circulating stream to be concentrated is as follows:

| CO | CO$_2$ | H$_2$ | CH$_4$ | N$_2$ |
|---|---|---|---|---|
| 6.75 | 3.72 | 66.78 | 11.78 | 10.97 |

As can be seen from this composition, the R value is excessively large. In applying this invention, it is preferable, therefore, to regulate the value of R by adding carbon monoxide, or carbon dioxide which has larger availability, to the circulating stream to be concentrated. It is also possible to add, after the removal of carbon monoxide and carbon dioxide, nitrogen to the stream and to synthesize ammonia thereby concentrating inert components.

The process according to this invention of concentrating inert components by the compression of the discharge stream to be removed is not necessarily limited to the use of only one compression. Namely, if the reactants are present in relatively large amounts in the stream to be removed even after the inert components are concentrated by the process of this invention, it is possible to repeat the process consisting of compression, synthesis reaction, and separation of the desired products thus synthesized.

What we claim is:

1. In a synthesis process in which a circulating stream comprising a mixture of fluid reactants and inert components is continuously circulated through a closed loop circulatory pressurized synthesis system and the reactants are partially reacted with each other in the presence of catalyst at a high-synthesis temperature and at a high-synthesis pressure during each pass through the synthesis system to form the desired end product, the improvement in said process which comprises the steps of continuously discharging from said synthesis system a portion of the circulation stream and simultaneously recirculating the remainder of said circulating stream through said synthesis system, said discharged portion serving for removing inert components from the circulating stream in said synthesis system in order to maintain a suitable concentration of reactants in the circulating stream in said synthesis system:

pressurizing said discharged portion to a pressure higher than the synthesis pressure of the synthesis system, then passing said pressurized discharged portion through synthesis reactor means separate from said synthesis system and containing catalyst at a temperature to effect a further synthesis reaction of the reactants in the pressurized discharged portion whereby there is produced a further quanity of the desired end product, then separating the desired end product from the effluent from said synthesis reactor means, to give an effluent which has a higher concentration of inert components than said portion initially discharged from the synthesis system.

2. A process according to claim 1, in which additional reactants are added to said discharged portion before it is pressurized to said higher pressure.

3. A process according to claim 1, including the further steps of flowing said effluent substantially free of desired end product in a stream separate from said discharged portion and expanding said effluent in said stream by reducing the pressure thereon to a level lower than the pressure in the synthesis system and utilizing the energy generated by said expansion to carry out said pressurizing step, and then removing from the process the entirety of said stream of expanded effluent.

4. A process according to claim 1, including the further steps of flowing said effluent substantially free of desired end product in a stream separate from said discharged portion and expanding said effluent in said stream by reducing the pressure thereon to a level lower than the pressure in the synthesis system and utilizing the energy generated by said expansion to carry out said pressurizing step, and then removing from the process the entirety of said stream of expanded effluent.

5. A process according to claim 1, in which the effluent from said synthesis reactor means is cooled to condense the end product in said effluent and then said end product is separated from the effluent.

6. A process according to claim 1, in which said pressurized discharged portion is flowed in series through a plurality of synthesis reactors and the effluent from each synthesis reactor is cooled to condense and separate the end product in said effluent.

7. A process according to claim 6, including the further steps of flowing said effluent substantially free of desired end product in a stream separate from said discharged portion and expanding said effluent in said stream from the last synthesis reactor by reducing the pressure thereon to a level lower than the pressure in the synthesis system and utilizing the energy generated by said expansion to carry out said pressurizing step and then removing from the process the entirety of said stream of expanded effluent.

8. A process according to claim 1, in which a fraction of said effluent substantially free of desired end product is pressurized again to substantially the same pressure as the incoming pressurized discharged portion and is mixed therewith and then the latter mixture is fed to said synthesis reactor means.

9. A process according claim 8, including the further steps of flowing said effluent substantially free of desired end product, after said fraction is removed, in a stream separate from said discharged portion and expanding said effluent in said stream by reducing the pressure thereon to a level lower than the pressure in the synthesis system and utilizing the energy generated by said expansion to carry out said step of pressurizing said discharged portion, and then removing from the process the entirety of said stream of expanded effluent.

10. A process according to claim 8, in which the effluent from said synthesis reactor means is cooled to condense and separate the end product in said effluent.